(12) United States Patent
Liu et al.

(10) Patent No.: US 10,338,633 B2
(45) Date of Patent: Jul. 2, 2019

(54) SLEW-DRIVEN CLOCK TREE SYNTHESIS

(71) Applicants: Drexel University, Philadelphia, PA (US); Stony Brook University, Stony Brook, NY (US)

(72) Inventors: Weicheng Liu, Centereach, NY (US); Emre Salman, Saint James, NY (US); Ahmet Can Sitik, Hillsboro, OR (US); Baris Taskin, Philadelphia, PA (US)

(73) Assignees: Drexel University, Philadelphia, PA (US); Stony Brook University, Stony Brook, NY (US)

( * ) Notice: Subject to any disclaimer, the term of this patent is extended or adjusted under 35 U.S.C. 154(b) by 0 days.

(21) Appl. No.: 15/621,940

(22) Filed: Jun. 13, 2017

(65) Prior Publication Data
US 2017/0357286 A1 Dec. 14, 2017

Related U.S. Application Data

(60) Provisional application No. 62/349,544, filed on Jun. 13, 2016.

(51) Int. Cl.
*G06F 17/50* (2006.01)
*G06F 1/10* (2006.01)
*G06F 7/544* (2006.01)

(52) U.S. Cl.
CPC ............... *G06F 1/10* (2013.01); *G06F 7/544* (2013.01); *G06F 17/505* (2013.01); *G06F 17/5072* (2013.01); *G06F 17/5077* (2013.01)

(58) Field of Classification Search
CPC ............... G06F 17/505; G06F 17/5072; G06F 17/5077; G06F 1/10; G06F 7/544; G06F 2217/62
See application file for complete search history.

(56) References Cited

U.S. PATENT DOCUMENTS 9,135,375 B1 * 9/2015 Sood ...................... G06F 17/50

OTHER PUBLICATIONS

E. Salman and E. G. Friedman, "High Performance Integrated Circuit Design," Jun. 2012, McGraw-Hill Education; 1 edition pp. 541-582.
Cai et al., "Obstacle-Avoiding and Slew-Constrained Clock Tree Synthesis With Efficient Buffer Insertion," IEEE Transactions on Very Large Scale Integration (VLSI) Systems, Jan. 2014, p. 142-155, vol. 23, No. 1.
Cong et al., "Bounded-Skew Clock and Steiner Routing," ACM Transactions on Design Automation of Electronic Systems, Jul. 1998, p. 341-388, vol. 3, No. 3.
Dixon-Warren, "A Review of TSMC 28 nm Process Technology," ChipWorks, Dec. 2012, https://www.chipworks.com/about-chipworks/overview/blog/review-tsmc-28-nm-process-technology.
Edahiro, Masato, "A Clustering-Based Optimization Algorithm in Zero-Skew Routings," ACM/IEEE Design Automation Conference, Jun. 1993, p. 612-616.

(Continued)

*Primary Examiner* — Vuthe Siek
(74) *Attorney, Agent, or Firm* — Schott, P.C.

(57) ABSTRACT

A system for performing slew-driven clock tree synthesis includes pair selection and cost metric definition considering physical distance for efficient sink clustering; slew and skew-aware merging point computation for routing; and slew and insertion slew-aware net splitting.

14 Claims, 9 Drawing Sheets

(56) References Cited

OTHER PUBLICATIONS

I. Kourtev and E. Friedman, "Clock Skew Scheduling for Improved Reliability via Quadratic Programming," IEEE/ACM International Conference on Computer-Aided Design, Nov. 1999, p. 239-243.

J. A. Hartigan and M. A. Wong, "A K-Means Clustering Algorithm," Journal of the Royal Statistical Society. Series C, 1979, p. 100-108, vol. 28, No. 1.

K. Boese and A. Kahng, "Zero-Skew Clock Routing Trees With Minimum Wirelength," Proceedings of IEEE International ASIC Conference and Exhibit, 1992, p. 17-21.

Kashyap et al., "Closed-Form Expressions for Extending Step Delay and Slew Metrics to Ramp Inputs for RC Trees," IEEE Transactions on Computer-Aided Design of Integrated Circuits and Systems, Apr. 2004, p. 509-516, vol. 23, No. 4.

Kurd et al, "A Multigigahertz Clocking Scheme for the Pentium® 4 Microprocessor," IEEE Journal of Solid-State Circuits, Nov. 2001, p. 1647-1653, vol. 36, No. 11.

Lee et al, "Low-power Clock Trees for CPUs," Proceedings of IEEE/ACM International Conference on Computer-Aided Design, Nov. 2010, p. 444-451.

Lu et al., "Fast Power- and Slew-Aware Gated Clock Tree Synthesis," IEEE Transactions on Very Large Scale Integration (VLSI) Systems, Nov. 2012, p. 2094-2103, vol. 20, No. 11.

Qian et al., "Modeling the "Effective Capacitance" for the RC Interconnect of CMOS Gates," IEEE Transactions no Computer-Aided Design of Integrated Circuits and Systems, Dec. 1994, p. 1526-1535, vol. 13, No. 12.

R. Chaturvedi and J. Hu, "An Efficient Merging Scheme for Prescribed Skew Clock Routing," IEEE Transactions on Very Large Scale Integration, Jun. 2005, p. 750-754, vol. 13, No. 6.

The ITRS Technology Working Groups, "International Technology Roadmap for Semiconductors 2010 Update."

W. C. Elmore, "The Transient Response of Damped Linear Networks with Particular Regard to Wideband Amplifiers," Journal of Applied Physics, 1948, p. 55-63, vol. 19, No. 1.

* cited by examiner

| Circuits | Case 1 (DME) | | | Case 2 | | | Case 3 (SLECTS) | | |
| --- | --- | --- | --- | --- | --- | --- | --- | --- | --- |
| | Slew (ps) | Skew (ps) | CP (mW) | Slew (ps) | Skew (ps) | CP (mW) | Slew (ps) | Skew (ps) | CP (mW) |
| cns03 | 83.4 | 35.0 | 31.7 | 84.7 | 51.7 | 30 | 87.0 | 52.8 | 30.7 |
| cns04 | 86.4 | 79.5 | 41.5 | 86.5 | 55.4 | 37.4 | 89.8 | 41.8 | 37.2 |
| cns05 | 84.8 | 27.0 | 19.0 | 81.5 | 54.1 | 18.1 | 87.4 | 51.1 | 17.5 |
| cns06 | 84.5 | 42.4 | 24.9 | 82.3 | 32.8 | 25.1 | 88.2 | 63.5 | 24.1 |
| cns07 | 88.2 | 50.6 | 42.1 | 87.7 | 37.9 | 38.7 | 90.1 | 47.8 | 38.9 |
| cns08 | 85.0 | 44.0 | 29.7 | 83.2 | 32.4 | 26.8 | 92.9 | 48.2 | 26.6 |
| Normalized | <100ps | <100ps | 1.00 | <100ps | <100ps | 0.93 | <100ps | <100ps | 0.93 |

Fig. 7, Table 2, Showing the proposed pair selection and merging point computation schemes with reported clock power (CP), clock skew and clock slew (at worst corner) of 1GHz and full 0.9 ×Vdd in 45nm CMOS technology

| Circuits | Case 1 (DME) | | | Case 2 | | | Case 3 (SLECTS) | | |
| --- | --- | --- | --- | --- | --- | --- | --- | --- | --- |
| | Slew (ps) | Skew (ps) | CP (mW) | Slew (ps) | Skew (ps) | CP (mW) | Slew (ps) | Skew (ps) | CP (mW) |
| cns03 | 83.8 | 93.0 | 27.0 | 84.9 | 43.0 | 22.6 | 86.2 | 71.0 | 22.8 |
| cns04 | 85.6 | 83.0 | 31.4 | 85.4 | 51.0 | 26.8 | 85.5 | 92.0 | 27.4 |
| cns05 | 84.4 | 91.0 | 14.1 | 85.2 | 51.0 | 13.0 | 86.9 | 74.0 | 11.7 |
| cns06 | 85.6 | 81.0 | 18.8 | 87.3 | 96.2 | 18.4 | 90.8 | 84.6 | 18.4 |
| cns07 | 84.0 | 88.0 | 38.5 | 85.3 | 71.0 | 27.8 | 85.0 | 62.0 | 27.8 |
| cns08 | 84.3 | 69.0 | 24.3 | 85.3 | 47.5 | 20.3 | 85.2 | 77.9 | 19.8 |
| Normalized | <100ps | <100ps | 1.00 | <100ps | <100ps | 0.84 | <100ps | <100ps | 0.83 |

FIG. 8, Table 3, Showing the proposed pair selection and merging point computation schemes with reported clock power (CP), clock skew and clock slew (at worst corner) of 1GHz and 0.63 ×Vdd in 45nm CMOS technology.

| Circuits | Case 1 (DME) | | | Case 2 | | | Case 3 (SLECTS) | | |
|---|---|---|---|---|---|---|---|---|---|
| | Slew (ps) | Skew (ps) | CP (mW) | Slew (ps) | Skew (ps) | CP (mW) | Slew (ps) | Skew (ps) | CP (mW) |
| cns03 | 45.7 | 45.7 | 8.8 | 45.1 | 17.2 | 8.2 | 46.0 | 18.5 | 8.1 |
| cns04 | 44.7 | 47.3 | 7.8 | 46.2 | 11.1 | 6.9 | 46.3 | 25.9 | 6.9 |
| cns05 | 43.8 | 40.7 | 3.4 | 45.6 | 14.7 | 3.0 | 46.2 | 28.1 | 3.0 |
| cns06 | 45.5 | 25.8 | 6.1 | 45.5 | 27.9 | 5.9 | 46.8 | 25.9 | 5.9 |
| cns07 | 44.9 | 44.4 | 9.7 | 45.8 | 21.2 | 8.8 | 46.4 | 23.7 | 8.7 |
| cns08 | 44.9 | 34.5 | 6.9 | 45.8 | 18.6 | 6.2 | 46.9 | 19.6 | 6.2 |
| Normalized | <50ps | <50ps | 1.00 | <50ps | <50ps | 0.91 | <50ps | <50ps | 0.91 |

FIG. 9, Table 5: Showing the proposed pair selection and merging point computation schemes with reported clock power (CP), clock skew and clock slew (at worst corner) of 2GHz and full $0.9 \times V_{dd}$ in 20nm FinFET technology.

| Circuits | Case 1 (DME) | | | Case 2 | | | Case 3 (SLECTS) | | |
|---|---|---|---|---|---|---|---|---|---|
| | Slew (ps) | Skew (ps) | CP (mW) | Slew (ps) | Skew (ps) | CP (mW) | Slew (ps) | Skew (ps) | CP (mW) |
| cns03 | 48.5 | 48.4 | 4.5 | 48.7 | 21.8 | 4.0 | 48.7 | 33.0 | 4.0 |
| cns04 | 47.2 | 33.7 | 3.8 | 48.5 | 24.8 | 3.4 | 48.2 | 42.3 | 3.3 |
| cns05 | 47.6 | 37.8 | 1.6 | 48.3 | 32.6 | 1.5 | 48.7 | 26.4 | 1.5 |
| cns06 | 48.5 | 32.4 | 3.0 | 49.3 | 44.6 | 2.9 | 49.0 | 36.0 | 2.9 |
| cns07 | 48.9 | 47.3 | 4.7 | 49.7 | 39.4 | 4.3 | 49.2 | 32.4 | 4.3 |
| cns08 | 46.8 | 48.8 | 3.5 | 48.6 | 19.9 | 3.1 | 49.0 | 37.3 | 3.1 |
| Normalized | <50ps | <50ps | 1.00 | <50ps | <50ps | 0.90 | <50ps | <50ps | 0.90 |

FIG. 10, Table 6: Showing the proposed pair selection and merging point computation schemes with reported clock power (CP), clock skew and clock slew (at worst corner) of 2GHz and $0.63 \times V_{dd}$ in 20nm FinFET technology.

| Circuits | Case 1 (DME) | | | Case 2 | | | Case 3 (SLECTS) | | |
|---|---|---|---|---|---|---|---|---|---|
| | Slew (ps) | Skew (ps) | CP (mW) | Slew (ps) | Skew (ps) | CP (mW) | Slew (ps) | Skew (ps) | CP (mW) |
| cns03 | 25.9 | 42.8 | 20.0 | 26.8 | 14.9 | 15.5 | 27.1 | 49.4 | 15.5 |
| cns04 | 26.7 | 40.4 | 15.4 | 26.6 | 43.5 | 13.3 | 26.8 | 49.2 | 13.2 |
| cns05 | 25.8 | 46.0 | 7.5 | 25.5 | 20.3 | 5.9 | 25.6 | 49.7 | 5.9 |
| cns06 | 28.1 | 45.9 | 11.9 | 28.0 | 42.4 | 11.5 | 27.6 | 43.8 | 11.1 |
| cns07 | 27.1 | 43.9 | 21.3 | 27.6 | 40.6 | 16.9 | 27.1 | 18.4 | 16.6 |
| cns08 | 27.5 | 42.2 | 13.3 | 27.1 | 43.3 | 11.8 | 28.7 | 42.6 | 11.8 |
| Normalized | <33ps | <50ps | 1.00 | <33ps | <50ps | 0.84 | <33ps | <50ps | 0.83 |

FIG. 11, Table 7: Showing the proposed pair selection and merging point computation schemes with reported clock power (CP), clock skew and clock slew (at worst corner) of 3GHz and full 0.9×$V_{dd}$ in 20nm FinFET technology.

| Circuits | Case 1 (DME) | | | Case 2 | | | Case 3 (SLECTS) | | |
|---|---|---|---|---|---|---|---|---|---|
| | Slew (ps) | Skew (ps) | CP (mW) | Slew (ps) | Skew (ps) | CP (mW) | Slew (ps) | Skew (ps) | CP (mW) |
| cns03 | 29.8 | 43.1 | 11.0 | 30.1 | 13.8 | 9.3 | 30.7 | 23.8 | 9.2 |
| cns04 | 29.4 | 46.3 | 9.1 | 30.2 | 24.7 | 7.8 | 30.9 | 28.7 | 7.7 |
| cns05 | 29.6 | 44.4 | 4.1 | 29.5 | 31.5 | 3.5 | 29.4 | 30.6 | 3.5 |
| cns06 | 31.3 | 47.5 | 7.1 | 31.2 | 20.0 | 6.7 | 31.1 | 32.9 | 6.6 |
| cns07 | 29.6 | 44.3 | 12.4 | 30.4 | 17.6 | 10.1 | 30.7 | 28.7 | 10.0 |
| cns08 | 29.9 | 48.1 | 9.5 | 29.9 | 49.7 | 7.0 | 30.5 | 33.6 | 7.0 |
| Normalized | <33ps | <50ps | 1.00 | <33ps | <50ps | 0.84 | <33ps | <50ps | 0.83 |

FIG. 12, Table 8: Showing the proposed pair selection and merging point computation schemes with reported clock power (CP), clock skew and clock slew (at worst corner) of 3GHz and 0.72×$V_{dd}$ in 20nm FinFET technology.

|  | Synopsys IC Compiler | | | Proposed Methodology | | |
|---|---|---|---|---|---|---|
|  | Slew (ps) | Skew (ps) | Power (mW) | Slew (ps) | Skew (ps) | Power (mW) |
| s38584 | 114.8 | 55.4 | 6.893 | 77.6 | 26.8 | 3.853 |
| s38417 | 111.8 | 95.4 | 5.931 | 76.5 | 24.7 | 4.366 |
| s35932 | 109.1 | 79.2 | 8.056 | 76.7 | 27.6 | 4.765 |
| Normalized |  |  | 1.00 |  |  | 0.62 |

FIG. 13, Table 9

|  | Synopsys IC Compiler | | | Proposed Methodology | | |
|---|---|---|---|---|---|---|
|  | Slew (ps) | Skew (ps) | Power (mW) | Slew (ps) | Skew (ps) | Power (mW) |
| s38584 | 114.8 | 55.4 | 6.893 | 77.6 | 26.8 | 3.853 |
| s38417 | 111.8 | 95.4 | 5.931 | 76.5 | 24.7 | 4.366 |
| s35932 | 109.1 | 79.2 | 8.056 | 76.7 | 27.6 | 4.765 |
| Normalized |  |  | 1.00 |  |  | 0.62 |

FIG. 14, Table 10

SLEW-DRIVEN CLOCK TREE SYNTHESIS

BACKGROUND

Clock skew is a problem in circuit design where signals arrive at different nodes at different time. Clock skew can contribute to 10% of a system cycle time, increased power consumption, and noise. Clock skew is a well-known challenge and its impact may be addressed with clock tree synthesis (CTS) algorithms such as H-tree algorithm, zero skew algorithm, or deferred merge embedding (DME).

A methodical investigation of clock slew, which is the changing rate of voltage through a circuit (or wire) over time, however, is mostly unaddressed. In particular, for clock slew, interconnect resistance significantly increases at every new technology node. The increase in the interconnect resistance makes it more challenging to satisfy slew constraints on long wires. Furthermore, low voltage integrated circuit (IC) design is becoming a norm to limit power density while keeping up with Moore's Law, which exacerbates clock slew.

Current slew-constrained design techniques attempt to fix or avoid timing violations due to slew. Slew-awareness may be part of the clock tree synthesis (i.e. slew-driven).

SUMMARY OF THE EMBODIMENTS

A system for performing slew-driven clock tree synthesis may include the following processes: pair selection and cost metric definition considering physical distance for efficient sink clustering; slew and skew-aware merging point computation for routing; and slew and insertion slew-aware net splitting.

BRIEF DESCRIPTION OF THE DRAWINGS

FIG. 7 shows Table 2.
FIG. 8 shows Table 3.
FIG. 9 shows Table 5.
FIG. 10 shows Table 6.
FIG. 11 shows Table 7.
FIG. 12 shows Table 8.
FIG. 13 shows Table 9.
FIG. 14 shows Table 10.

DETAILED DESCRIPTION OF THE EMBODIMENTS

1. Introduction

Figure 1:
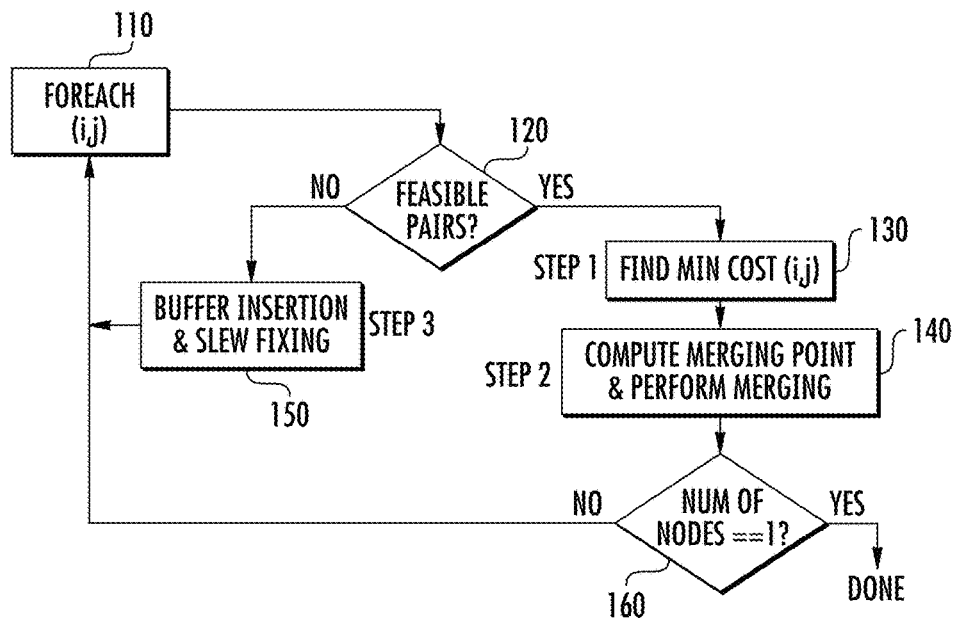
FIG. 1 shows a deferred merge embedding (DME) method illustrated with a flow chart.

The system herein introduces a slew-driven CTS methodology called SLECTS, an abbreviation for slew driven CTS. SLECTS methodology is adept at delivering timing and power targets that may yield better results than those achieved in traditional delay/skew-driven CTS methods.

Instead of targeting skew minimization as the primary objective and resolving slew violations with buffer insertion with a capacitance or slew bound, as in traditional skew-driven CTS, SLECTS may target slew optimization at every stage of the synthesis, such as clustering (i.e. merging) clock tree nodes, defining routing points and handling long interconnects. Another approach of traditional skew-driven CTS is to perform skew minimization in the first stage and resolve slew violations in post-CTS optimization. Skew-driven CTS uses buffering and sizing to constrain only skew during the CTS process, and may use additional buffering and sizing post-CTS to remove slew violations.

SLECTS, on the other hand, may use buffering and clustering more efficiently to constrain skew and slew simultaneously, so the tree is correct by design. Due to this efficient slew handling and efficient use of buffering, SLECTS may yield reduced power dissipation while satisfying the slew and skew constraints. In the algorithmic infrastructure developed on the deferred-merge-embedding (DME) procedure, the proposed slew-driven CTS methodology includes: 1) a net splitting method, 2) a merging point computation method, 3) a cost metric for the merging process. SLECTS may replace the core DME routines that drive the contemporary CTS tools.

Skew-driven CTS tools may convert a slew-driven flow more appropriate for state-of-the-art technologies. The experimental results discussed hereafter demonstrate that the net splitting method assists in the slew-feasibility of a clock tree that has long interconnects. Merging point computation and cost metrics described herein may provide power consumption less than that of existing methods. The final power savings compared to a (traditional, skew-driven) DME implementation satisfying the same skew and slew constraints are 7% while operating at the nominal voltage (10% off from Vdd at 0.9×Vdd at worst corner) of a 1 GHz 45 nm technology node. The power savings against the conventional improve to 17% while operating at a lower voltage node (10% off worst corner from the selected 0.7×Vdd supply voltage at 0.63×Vdd, due to availability of voltage levels in the target technology library). The increased savings of 17% (up from 7%) for low voltage 0.63×Vdd operation highlights the slew-driven approach of the proposed methodology in performing in tighter slew constraints (i.e. at lower voltage). As an added embodiment, experimentation with the FinFET-based technologies show that the proposed slew-driven CTS methodology facilitates voltage and frequency scaling that is challenging in traditional CTS methodologies. In this setup, the power savings may increase to 10% at 2 GHz, and to 17% in 3 GHz compared to skew-driven CTS methodologies, validating the slew-driven approach of SLECTS at a 20 nm FinFET technology node.

The potential to i) perform voltage scaling and ii) achieve lower propagation delays may be achieved with Fin Field Effect Transistor (FinFET) gates (i.e. permitting frequency scaling). In FinFET technology, the slew constraints are tighter due to these multi-GHz frequencies of operation (i.e. through frequency scaling). SLECTS may satisfy these tighter slew constraints that are exacerbated by the increasing dominance of slew at lower voltages (i.e. through voltage scaling). In brief, frequency scaling of CTS may be enabled with SLECTS beyond those that may be economically realistic with skew-driven CTS algorithms. This not only enables clock signals with higher operating frequencies to be distributed over a clock tree network, but also may accomplish this distribution with power savings compared to skew-driven CTS methods. For reference, experimental results in 20 nm technology show 55% and 51% power savings at 2 GHz and 3 GHz, respectively, when the SLECTS power savings steps (merging pair selection and merging point computation) are combined with the power savings through voltage scaling (that is enabled thanks to the net splitting techniques of SLECTS). Furthermore, the efficient voltage scaling through SLECTS results in achieving 1.5× frequency (from 2 GHz to 3 GHz) with an insignificant 3% increase in power consumption.

2. Deferred Merge Embedding (DME) Method

FIG. 1 shows a deferred merge embedding (DME) method illustrated with a flow chart, and is a technique used for clock tree synthesis and in essence searches for the minimum cost pair among all node pairs. The method considers each pair (i,j) for positioning (or merging) 110 and then determines if there is a feasible merge point for each of these pairs 120. After the feasible pairing query, if any feasible pairs exist, the minimum cost pair is merged to the calculated merge point. Otherwise, buffer insertion is utilized to split the long interconnect. The SLECTS method may include these steps:

A pair selection and cost metric definition considering physical distance for efficient sink clustering 130;

A slew and skew-aware merging point computation for routing 140; and

A slew and insertion delay-aware net splitting 150.

Three steps are presented in Sections 2.1, 2.2 and 2.3, respectively. The SLECTS method may be repeated until the number of nodes from the set of nodes under examination equals one 160.

2.1 Merging Pair Selection 130

As the DME algorithm searches for the minimum cost pair among all pairs, the selection procedure and the cost definition may dictate the quality of results. Thus, several pair selection techniques and cost definitions may be used and which are classified into 2 groups: 1) distance-based, and 2) delay-based. Distance-based approach may consider the physical distance between two nodes as a cost metric, and merges minimum distance pairs. In terms of accuracy, distance based merging pair selection suffers from the well-known deficiencies of using length as a delay metric. In terms of algorithmic complexity, the complexity of distance-based approach may be $O(n \log n)$, as merging is performed by selecting all minimum pairs in one iteration. This means that as the number of nodes n increases, the time to execute the algorithm will increase proportional to $n \log n$. As the pairs are not selected one at a time, however, the merging of a new node (created by a previous merging) with an existing node may not be considered. This selection may result in longer run-times.

The delay-based approach may be higher in accuracy in terms of satisfying skew. Delay is typically estimated with Elmore delay, and common merging pair cost computations consider potential wire-snaking between candidate nodes, as well. The delay-based approach for instance, first identifies the candidate merging node with the maximum delay target (i.e. candidate node with the minimum insertion delay from the node to the clock sinks in its downstream). The approach may then find a minimum cost pair for this node where cost is defined as the (e.g. Elmore) delay to a candidate pair node, including the distance added to perform potential wire snaking. This approach may provide improved skew results, however, restricting the selection of the minimum distance node may not guarantee the minimum distance selection, thereby degrading clock slew. In terms of algorithmic complexity, the maximum delay target node and its minimum pair are identified with a linear search [both $O(n)$ complexity], resulting in a complexity of $O(n^2)$. This means that the time to execute the algorithm increases proportional to the square of n.

2.1.1 Merging Pair Selection Description

Delay-based cost may result in pairing nodes that are physically farther to minimize skew, which may be detrimental to slew, and considering wire snaking as part of cost metric may be inaccurate. Wire snaking may be detrimental to slew, therefore, buffer insertion may be a more viable option for the merging pairs that may require higher wire snaking.

A distance-based approach may be selected as the cost metric favoring reduced slew degradation on the path. Using a distance-based cost may result in several subtree clusters that have different capacitance and delay values. This may make merging harder at the top-level of a clock tree due to the insertion delay mismatches. However, the potential effects of these mismatches may be fixed by buffer insertion and/or wire snaking, and the power overhead of these processes are shown, experimentally, to be less than those necessary to fix slew following a traditional skew-driven CTS application through DME. Overall, SLECTS uses the distance (i.e. wire length) between two nodes as a cost metric for clustering nodes (i.e. merging), and uses slew with more accurate estimations (than net length, such as the one introduced in Section 2.2.1). This differs from traditional DME-based CTS routines.

The merging pair selection in SLECTS may be performed by considering all possible pairs (up to $n^2$ possibilities) at each iteration. This theoretical $O(n^3)$ complexity of this selection scheme may be avoided with data re-use. In the first iteration, the costs of all $n^2$ pairs of initial n nodes are computed [complexity of $O(n^2)$]. Starting from the second iteration, only the costs of merging the recently added node against the other (n−1) nodes [$O(n)$] are computed [complexity of $O(n^2)$] as the other pairing combinations are already computed in the first iteration. Thus, although the asymptotic complexity is still $O(n^3)$, the algorithm performs $O(n^2)$ computations and $O(n^3)$ look-ups. Section 3 shows experimental results demonstrating that the run time of the proposed methodology has a quadratic dependence [$O(n^2)$] on the circuit size.

2.2 Merging Point Computation 140

The merging point may be determined to perform routing of a minimum cost pair. One solution is to select a specific point for merging considering skew, using a zero-skew-tree DME (ZST-DME) algorithm. Another approach may use a bounded-skew-tree DME (BST-DME) to define merging regions considering the skew constraint in the bottom-up phase, and pick the minimum wirelength point at each region in the top-down phase. This early approach is applicable only in "unbuffered" clock routing. In practice, buffered clock tree routing is often seen, particularly when satisfying the slew constraints is more critical. Another practice is to use ZST-DME or BST-DME approaches as a first step, while allowing slew violations, and consider buffering as an added optimization step to remove violations. In slew-driven buffering, computing merging regions at each iteration of the bottom-up phase may be computationally expensive due to the highly complex slew estimation equation (introduced in Section 2.2.1), and allowing slew violations results in decisions based on inaccurate(ly high) slew on the nodes with violations.

2.2.1 Merging Point Computation Description

The skew constraint-based merging regions may be constructed in the bottom-up phase, similar to the BST-DME methodology. Unlike BST-DME methodology where merging regions are propagated in the bottom-up phase and the merging points are determined in the top-down phase, the merging point may be determined within this merging region considering the slew constraint in the same phase. This is an algorithmic change from traditional BST-DME and satisfies skew and slew constraints simultaneously.

This process may require a definition of a permissible merging window to satisfy the skew constraints, and the cross-referencing of this window with a minimum slew point to satisfy the slew constraint. The zero skew merging point may be computed as follows:

$$L_i = \frac{0.5C_{unit}L(i,j)^2 + L(i,j)C_j}{C_i + C_j + L(i,j)C_{unit}} + \frac{t_j - t_i}{R_{unit}(C_i + C_j + L(i,j)C_{unit})} \quad (1)$$

where L(i; j) is the distance between two nodes (µm), Runit and Cunit are the per unit resistance (Ω=µm) and capacitance (fF/µm) of the interconnect, respectively, ti and tj are the insertion delay from i and j to their sinks, respectively, and Ci and Cj are the capacitance at nodes i and j, respectively.

The proposed merging point computation algorithm is presented in Logic Flow 1:
Logic Flow 1 Merging Point Computation
1: Maxi=max[Dins(i)]
2: Maxj=max[Dins(j)]
3: Mini=min[Dins(i)]+skewconst
4: Minj=min[Dins(i)]+skewconst
5: Compute CS1 by computing LCS1 with Eq. (1) for ti=Maxi,
tj=Minj
6: Compute CS2 by computing LCS2 with Eq. (1) for ti=Mini,
tj=Maxj
7: Compute min slew point m by solving Eq. (4)
8: if min(CS1;CS2)<m<max(CS1;CS2) then
9: Merging point k=m
10: else if min(CS1;CS2)>m then
11: Merging point k=max(CS1;CS2)
12: else
13: Merging point k=min(CS1;CS2)
14: end if For each pair i-j that is to be merged, the permissible merging window may be defined based on the skew constraint. As expressed in Logic Flow 1 mathematically, each end point (CS1 and CS2) represents a corner case when the skew within i-j pair is equal to skew constraint skewconst, and any point in the permissible merging window satisfies this skew (i.e. <=skewconst). In literature, there are studies that aim to choose the middle of the permissible merging window as the merging point so as to increase the robustness of delivered skew to variations. As discussed herein, budgeting for both skew and slew may be achieved.

Each node has a pair of insertion delay numbers, which are the minimum and maximum insertion delay. The min [Dins(i)], max[Dins(i)], min[Dins(j)] and max[Dins(j)] represent the minimum and maximum insertion delay for node i and j, respectively Looking at Logic Flow 1 and using Eq. (1) at the end points, a permissible merging window may be generated along the axis of the ij pair (Lines 5-6). The permissible merging window may be a line of potential merging points on which the skew constraint is satisfied. After the permissible merging window is generated, the minimum slew point may be computed (Line 7). The minimum slew point is defined as the point that makes the slew at node i and j equal in order to obtain the minimum slew at both nodes. In order to estimate this point, a Probability distribution function Extension for Ramp Inputs (PERI) model may be used for slew propagation, which estimates the slew degradation S(W) on a wire segment W as:

$$S(W) = \ln(9) \times ED(W) \quad (2)$$

where ED(W) is the Elmore delay of the wire segment W, and estimates the output slew Sout(W) of a wire segment W as:

$$S_{out}(W) = \sqrt{S_{in}(W)^2 + S(W)^2} \quad (3)$$

where Sin(W) is the input slew of the wire segment Using Eq. (2) and Eq. (3), the minimum slew point m should satisfy the following equation:

$$S_i^2 - (\ln(9) \times ED(m,i))^2 = S_j^2 - (\ln(9) \times ED(m,j))^2 \quad (4)$$

where Si and Sj are the target slew values at nodes i and j, respectively. The target slew values are set to slew constraint slewconst at the sink level, and they are propagated bottom-up to the internal nodes after each merging. After Eq. (4) is re-organized in a closed-form, it becomes a third-order equation (as Elmore delay scales quadratically with wirelength). Thus, a single real positive root can be found when the equation satisfies D<0. Note that, D>0 case only occurs when m is computed to be farther than j [i.e. L(m; i)>L(j; i)], in which case m can directly be set to j. In other cases (i.e. when D<0), the position of point m is checked to identify whether it is within the permissible merging window (Line 8)

Figure 2A:
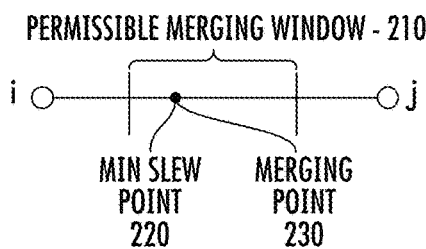
FIGS. 2(*a*) and 2(*b*) shows permissible merging window and min slew point definitions to identify a merging point.

If this is the case, m is set as the merging point k, as shown in FIG. 2(a) (Line 9). Considering two notes i and j, FIG. 2(a) shows a possible merging window 210 where the minimum slew point 220 is set as the merging point 230 when both are located within the possible merging window 210.

Figure 2B:
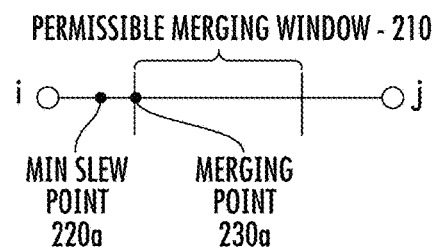

Otherwise, as shown in FIG. 2(b) when the minimum slew point 220a is outside the possible merging window 210, the merging point k 230a is set as one of the corner points, so as to satisfy skew constraints (Lines 10-13).

For cases where permissible merging window 210 does not exist (i.e. no possible point to satisfy skew constraint), buffer insertion (when the delay mismatch is larger than is smaller than one clock buffer delay) may be considered.

2.3 Slew-Aware Net Splitting 150

The high interconnect resistance of scaled semiconductor technologies may require shorter wires to be split which may not be necessary in older technologies. To this end, traditional DME-based CTS algorithms consider buffer insertion at the merging points only, and do not consider splitting the net (i.e. with buffering) after selecting merging pairs. This may result in slew violations on long distance nets and does not permit the desired voltage and frequency scaling. Syntesizing clock tree with slew violations may fix these violations later in the physical design flow, as a post-CTS optimization.

2.3.1 Slew-Aware Net Splitting Description

Figure 3A:
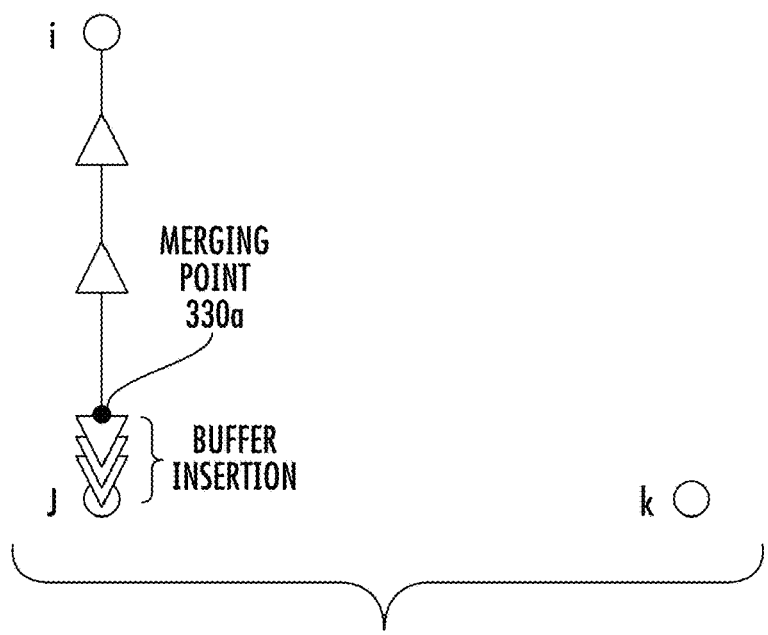
FIGS. 3(*a*) and 3(*b*) show an example of slew-are net splitting.
Figure 3B:
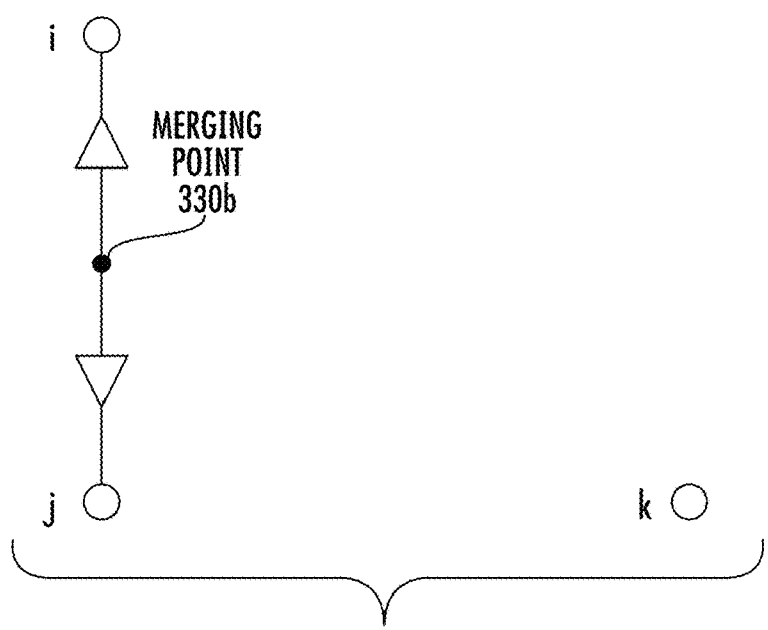

SLECTS may satisfy slew constraints while considering the insertion delays of the nodes to be merged. The purpose of considering insertion delays is to avoid a high buffering and wire snaking cost that is induced by a large mismatch between the insertion delays, and keep number of buffer levels balanced for process voltage temperature (PVT) variations. FIGS. 3(a) and 3(b) show an example of slew-aware net splitting. In this example, three nodes i, j and k are to be merged and a single buffer insertion cannot satisfy the slew constraint at either pair of nodes, therefore the net of the selected pair of nodes needs to be split with buffer insertion to satisfy slew constraint. Assume that i-j pair has the lowest cost (i.e. minimum distance as defined in Section 2.1), and is selected to be merged. One approach, depicted in FIG. 3(a), could start splitting from node i in order to bring the merging point 330a closer to j and k for a lower merging cost in the next iteration. However, this would significantly increase the insertion delay at node i, resulting in excessive buffering and/or wire snaking when merging i with the other nodes.

The insertion delay-aware net splitting technique, presented in Logic Flow 2, may address this issue.
Logic Flow 2: Net splitting for Slew Fixing
1: Costcurr=∞
2: for (i; j) in Unmerged nodes do
3: if Cost(i; j)<Costcurr then
4: Costcurr=Cost(i; j); si=i; s j=j
5: end if
6: end for
7: if Dins(si)<Dins(s j) then
8: Compute L using Eq. (7) with si
9: else
10: Compute L using Eq. (7) with s j
11: end if
12: Generate new node m at the computed location A Costcurr variable is maintained to keep the current cost between a node pair (i, j) (Line 1). For every unmerged node pair (i, j) (Line 2), its cost is compared with the previous pair (Line 3).

Logic Flow 2's proposed approach finds the minimum cost pair (si and s j in Line 4) and determines which node of the selected (i.e. minimum cost) pair has a smaller insertion delay. Then, the distance is computed from this lower insertion delay node (either si in Line 8 or sj in Line 10) to generate a new node m (Line 12). Starting net splitting from the node that has a smaller insertion delay provides a more balanced buffering, such as the one depicted in FIG. 3(b). In the Logic Flow 2 approach, the splitting point is determined as the longest feasible distance from the selected (smaller insertion delay) node. The longest feasible distance is computed using the slew constraint, the timing models of buffer and the interconnect metrics (per-unit resistance and capacitance). The output slew S(B) of a buffer B is estimated as:

$$S(B) = K_{cap}^{slew} \times C_{out} + K_{slew} \quad (5)$$

where Kslew/cap is the capacitance coefficient of output slew, Cout is the output capacitance of the buffer B and Kslew is the no-load slew of the buffer. The slew propagation on the wire segment is estimated using Eq. (2) and Eq. (3). Note that the input slew of the wire segment in Eq. (3) is equal to the output slew of the buffer driving this wire [S(B)=Sin(W)]. Combining Eq. (5), Eq. (2) and Eq. (3), the maximum distance L that a net can be split from a node i should satisfy the following equation:

$$Slew_{const} = \sqrt{(K_{cap}^{slew} \times (L \times C_{unit} + Cap_i))^2 + (\ln(9) \times ED(W))^2} \quad (6)$$

where Cunit is the per-unit capacitance of the wire. As Elmore delay has quadratic dependence distance L, Eq. (6) is a fourth-order equation. However, the equation can be simplified by generating look-up tables for the parameters that do not continuously change, and assuming that they are constant. It is a common practice to have look-up tables for the timing characteristics of different buffer sizes and different wire models, therefore assuming these discrete metrics to be constant requires a look-up table only for the metrics (Kslew/cap of each buffer size, per-unit resistance and capacitance of the clock routing layer, etc.) that are necessary to compute L.

After this simplification, the solution has a form of:

$$L = \frac{1}{K_1 \times Cap_i^2 + K_2 \times Cap_i + K_3} \quad (7)$$

where K1, K2 and K3 are the quadratic, linear and constant coefficients for the capacitive load at node i, respectively. A practical approach to solve Eq. (6) is to obtain a quadratic fit for Eq. (7), assuming the range of Capi values is known. In this work, Matlab is used to obtain these coefficients (K1, K2 and K3) by sweeping a small Capi range for each buffer and wire model combination. Once these coefficients are obtained, the algorithm can be implemented considering clock buffer library. As discussed, the largest size buffer in the library is used in order to split as large distance as possible in one iteration.

3. Experimental Results
3.1 Results 1

In an experimental setting, the proposed method was implemented with Perl and the quality of results presented with select International Symposium on Physical Design (ISPD '10) benchmarks. The power and the skew analyses are performed using Simulation Program for Integrated Circuits Emphasis HSPICE of Synopsys at 45 nm CMOS technology. The wire models were obtained from ISPD'10, which provides a per unit resistance of R=0.3 W/μm and a per unit capacitance of C=0.16 fF/μm. The slew and the skew constraints were assumed to be 10% of the period. All experiments are performed at the worst case of operation (90% Vdd, SS, 125_C) to identify the lower bounds of improvement of SLECTS. Reperforming the experiments at the nominal corner or a Monte Carlo analysis was a straightforward exercise and demonstrated higher improvements in power savings. In order to demonstrate the contribution of each step of the proposed methodology, four cases are generated as shown in Table 1.

|   | Step 1 | Step 2 | Step 3 |
|---|---|---|---|
| Case | Method in [4] | Method in [9] | N/A |
| Case | Method in [4] | Method in [9] | Prop. method |
| Case | Prop. method | Method in [9] | Prop. method |
| Case | Prop. method | Prop. method | Prop. method |

Table 1, where [4] is described in R. Chaturvedi and J. Hu, "An efficient merging scheme for prescribed skew clock routing," IEEE Transactions on Very Large Scale Integration (TVLSI) Systems, vol. 13, no. 6, pp. 750-754, June 2005 and [9] is described in K. Boese and A. Kahng, "Zero-skew clock routing trees with minimum wirelength," in IEEE International ASIC Conference and Exhibit, 1992, pp. 17-21.

Two comparisons were performed with these four cases:
1. Case 1 vs. Case 2 to demonstrate the impact of the proposed pair selection scheme 130.
2. Case 2 vs. Case 3 to demonstrate the impact of merging pair computation technique 140.

Improvements due to buffer insertion and slew fixing 150 may be seen in the proposed method (Case 0 vs. Case 1), as Case 0 implementation of the pair selection 130 and merging point computation 140 may not lead to feasible clock trees (without net splitting technique 150 for the ISPD'10 benchmarks operating even at 1 GHz in the selected 45 nm technology (i.e. slew/skew violations). A number of CTS solutions exist with the slew and skew requirements posed in a contest, such as the winners of the contest. Various CTS tools may benefit from the slew-driven concepts that construe SLECTS as a CTS flow, similar to DME routines being embedded within many CTS tools.

The results in Table 2 (FIG. 7) and Table 3 (FIG. 8)v show the nominal Vdd and low voltage (0.7×Vdd), respectively.

Note that the worst case Vdd was set as 0.9 s for each target Vdd, i.e. it is set to 63% of nominal Vdd when a low voltage node that runs at 0.7×Vdd (0.7 s 0:9=0:63) was considered. These results show the power savings provided by the proposed merging pair selection 130 and merging point computation 140 methods with the presence of high interconnect resistance, enabled by the net splitting technique 150 for each case. Table 2 shows that the SLECTS methodology provides 7% power savings compared to the traditional skew-driven DME-based CTS of Case 1 at 0.9× Vdd. Although the power savings were 7% at 0.9×Vdd, the power savings of SLECTS methodology showed an increasing trend with decreasing clock voltage (tested at 10% increments from Vdd, with 10% off for worst case operation): 7% at 0.9×Vdd (shown in Table 2), 11% at 0.81_Vdd (not shown due to space limitation), 16% at 0.72×Vdd (not shown due to space limitation) and 17% at 0.63×Vdd (shown in Table 3), compared to Case 1 operating at the same Vdd fractions. This shows that the slew-driven CTS, providing higher power savings when it is harder to satisfy slew constraints with reduced driving strength of clock buffers (i.e. at lower voltage levels).

Figure 4:
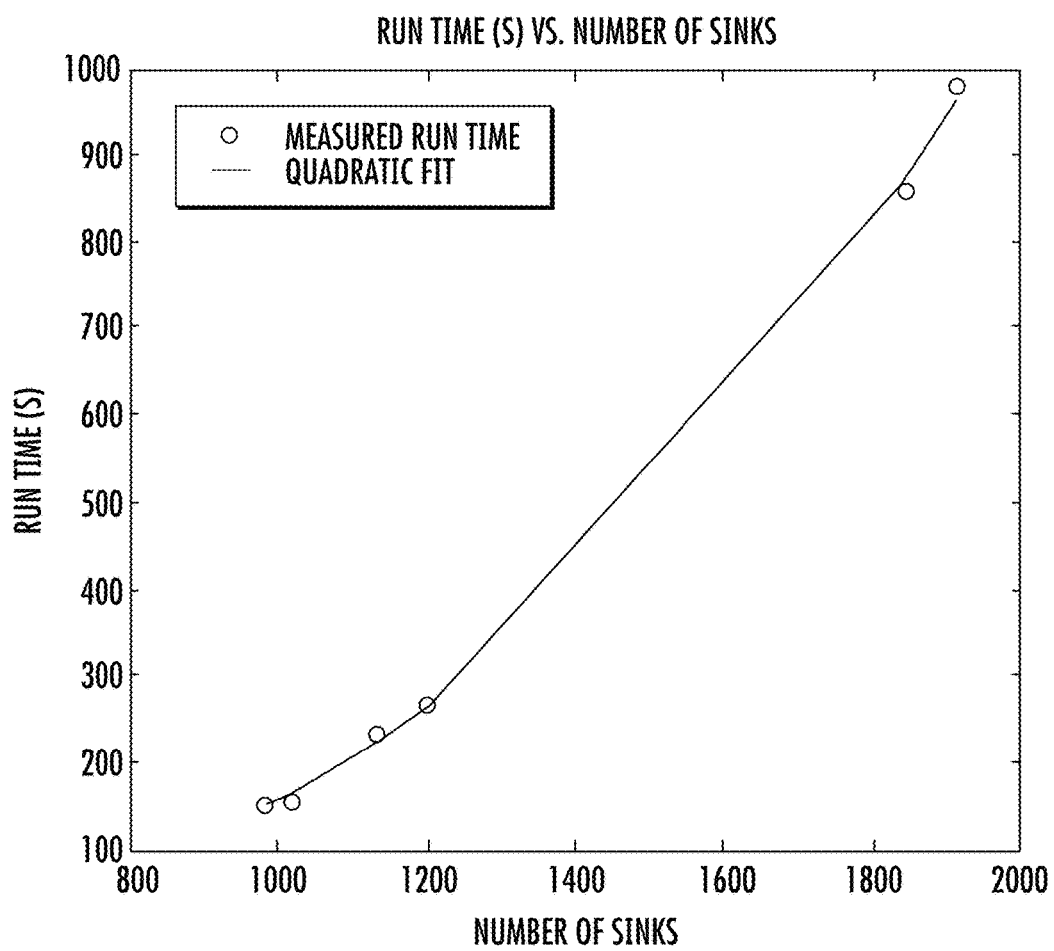
FIG. 4 shows the run time of SLECTS vs a number of clock sinks, compared to a quadratic fit.

The proposed methodology may provide significant power savings by enabling voltage scaling and exploiting slew. For reference, the power savings of SLECTS at 0.63×Vdd is a substantial 33% compared to Case 1 (DME) running at 0.9×Vdd. As explained in Section 2.1.1, the asymptotic O(n3) complexity of merging pair selection algorithm has reduced to O(n2) with data re-use. In order to empirically verify this, the run time of the SLECTS as a function of number of clock sinks is presented in FIG. 4. It is shown that the run time has a O(n2) profile, matching well to the quadratic fit, with R2=0.99. For comparison purposes, the run times of all cases (Case 1 through Case 3) are presented in Table 4.

TABLE 4

Run time comparison of all cases in 45 nm CMOS technology at 1 GHz and 0.63 × Vdd, in seconds.

| Circuits | Case 1 (DME) | Case 2 | Case 3 (SLECTS) |
| --- | --- | --- | --- |
| cns03 | 791 | 239 | 274 |
| cns04 | 2756 | 806 | 851 |
| cns05 | 485 | 142 | 156 |
| cns06 | 427 | 139 | 149 |
| cns07 | 3148 | 909 | 976 |
| cns08 | 661 | 212 | 230 |
| Normalized | 1.00 | 0.30 | 0.32 |

As the run time depends solely on the number of sinks, the run time for only one representative operation (45 nm CMOS at 1 GHz and 0.63_Vdd) is reported. Although all cases have the same complexity [O(n2)], the run time of Case 1 is significantly better than Case 1 (~3.3×). This speedup may be due to the proposed data re-use introduced in Section 2.1 performing better than targeting the node with minimum delay at each iteration, as proposed in.

The run time of Case 3 may be slightly higher than Case 2 due to the additional cost of computing minimum slew point 140 (Section 2.2.1). For SLECTS, the benchmark with the highest run time is cns07 (which has the highest number of clock sinks of 1915) with a run time of 976 seconds (~16 minutes). Note that this run time was significantly smaller than the run time limit (12 hours) of ISPD'10 clock contest (from where the benchmark circuits and the experimental setup are adopted).

3.2 Results 2: Comparison of Results Against the Commercial Synopsys Ic Compiler An experimental analysis was performed in order to show the quality of the proposed methodology against the commercial Synopsys IC Compiler tool. The experimental analysis was performed using 32 nm technology library provided by Synopsys for university research. Three largest circuits of ISCAS'89 benchmark circuits are used. The clock skew constraint is set to 50 ps, and the clock slew constraint is set to 100 ps and 150 ps, respectively, at 1.5 GHz and 1 GHz operations (15% of the clock period). The timing and the power consumption results were obtained in Synopsys HSPICE simulator.

Figure 6:
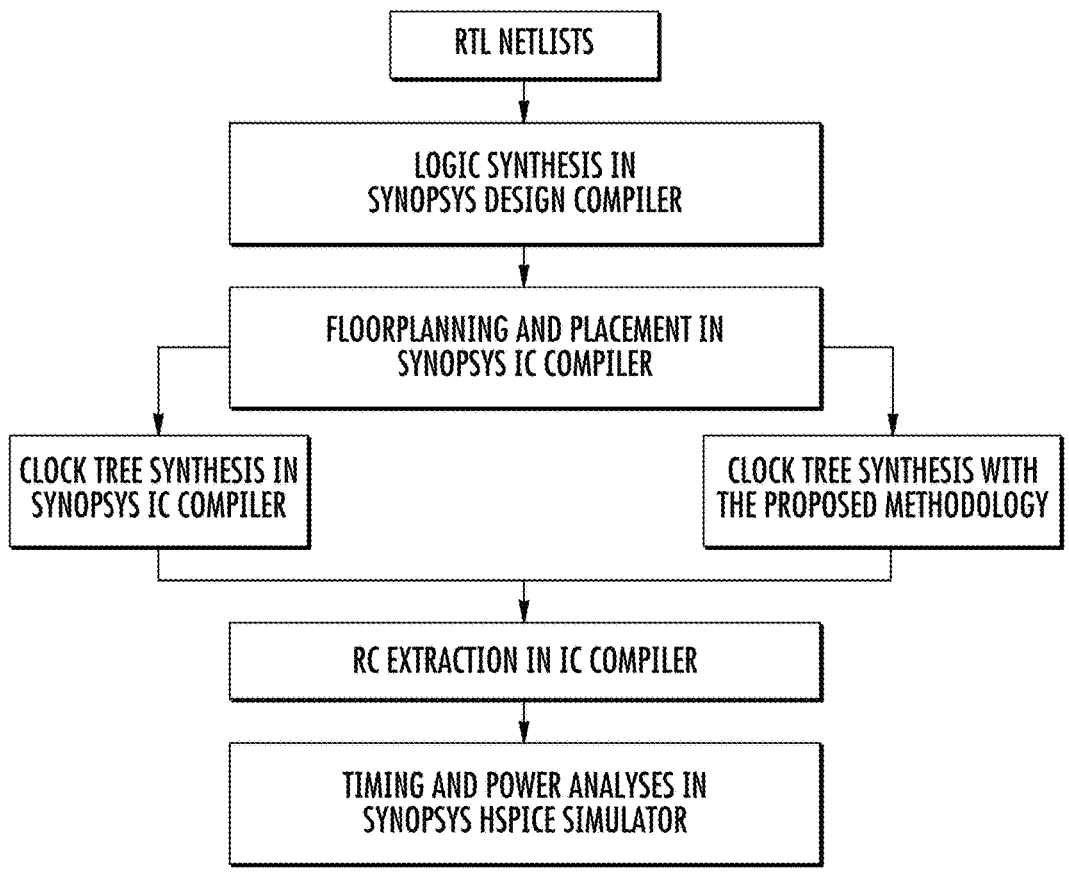
FIG. 6 shows two methodologies using the same flow before and after clock tree synthesis.

In order for a fair comparison, both clock tree synthesis methodologies (the proposed and the one available in Synopsys IC Compiler) used the same IC design flow until the clock tree synthesis, as shown in FIG. 6. The logic synthesis of RTL netlists is performed using Synopsys Design Compiler G-2012.06-SP5-2, and the floor planning and the placement stages are performed using Synopsys IC Compiler J-2014.09. After this step, two methodologies of clock tree synthesis, Synopsys IC Compiler and the proposed methodology, are used in parallel to obtain two different clock tree results. After the clock trees are obtained, the RC extraction is performed for both clock trees in Synopsys IC Compiler J-2014.09, and the timing (clock skew and slew) and the power analyses are performed in HSPICE H-2013.03.

The experimental results in Table 9 (FIG. 13) and Table 10 (FIG. 14) at 1.5 GHz and 1 GHz operation show that at 1.5 GHz operation with a 100 ps slew constraint, the Synopsys IC Compiler does not satisfy the slew constraint while the proposed methodology successfully satisfies the constraint, as shown in Table 9. Furthermore, the proposed methodology achieves 38% power savings while satisfying this tight slew constraint. At 1 GHz operation with a 150 ps slew constraint, both Synopsys IC Compiler and the proposed methodology satisfy the slew constraint. With the same slew constraint, the proposed methodology achieves an impressive 55% power savings.

The 1.5 and 1 GHz results show that the proposed methodology satisfies tight slew constraints, unlike the commercial Synopsys IC Compiler, and the proposed methodology achieves significant power savings at the same slew constraint, compared to the commercial Synopsys IC Compiler.

4. Aggressive Voltage & Frequency Scaling at FinFET Technology

With the introduction of FinFET technology, the appeal of voltage scaling for low power designs may be significant because of the higher tolerance of FinFET devices to voltage scaling (i.e. due to lower device resistance). The potential effects (both positive and negative) of CTS algorithms that are developed targeting planar CMOS technology may be to be considered as potential improvements targeting FinFET technology. To that end, the applicability of SLECTS may be considered in more detail. The trends and observations on the FinFET vs. planar CMOS-based clock trees are presented in Section 4.1, and the experimental results of SLECTS being used on FinFET-based clock trees [comparisons of Case 1 (DME) through Case 3 (SLECTS)] are presented in Section 4.2.

4.1 FinFET Vs. Planar CMOS

Figure 5:
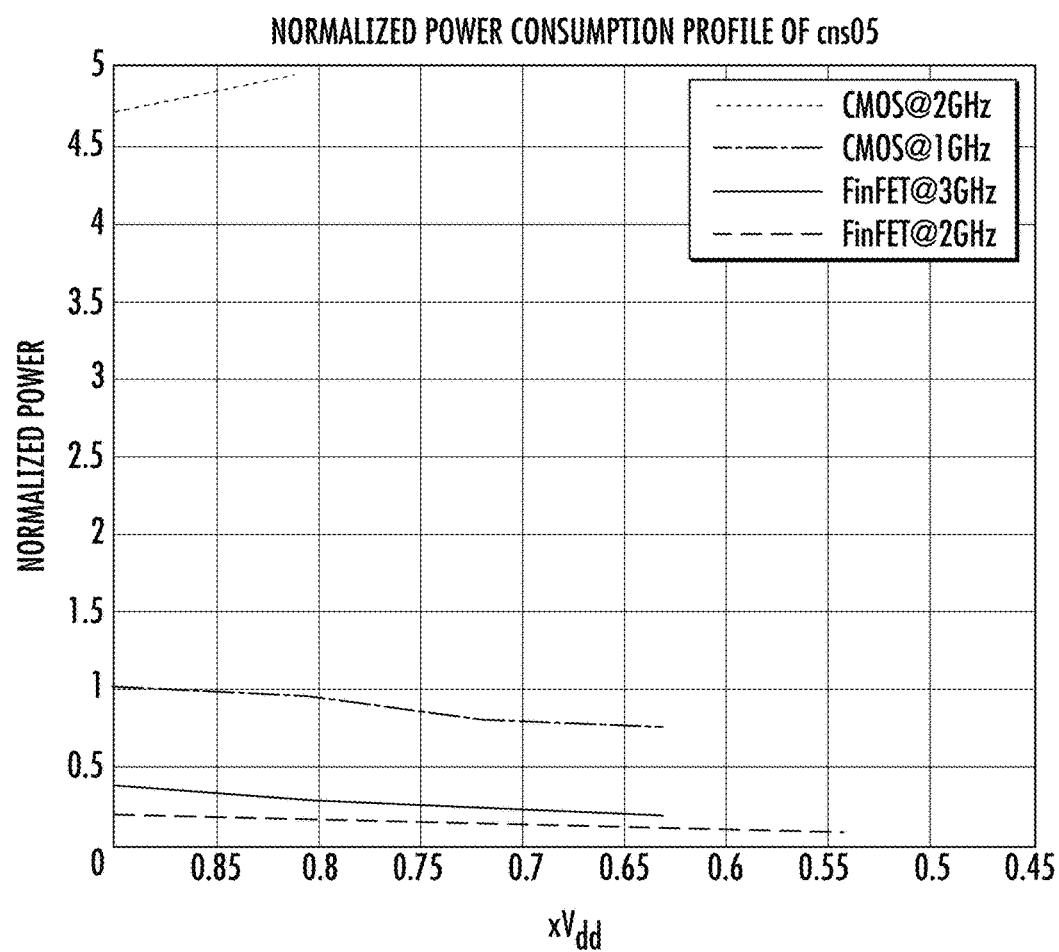
FIG. 5 shows power consumption, normalized to fill 0.9×Vdd Planar CMOS at 1 GHz, vs voltage scaling at various frequencies.

Voltage scaling within FinFET technology may be desirable due to i) its lower overhead on timing and ii) quadratic decrease in the dynamic portion of the power consumption. Furthermore, the low overhead on the timing may be used for frequency scaling to target high performance. In order to highlight this phenomenon along with the interdependence between voltage and frequency scaling, several clock trees were synthesized for cns05 (clock network synthesis benchmark circuit number 5) of ISPD'10 benchmarks in 20 nm FinFET technology at different conditions. Assuming a slew constraint at 10% of the clock period, several clock trees were synthesized (at each voltage-frequency pair to satisfy skew and slew constraints) at 2 GHz and 3 GHz, and at voltage levels ranging from 100% to 60% of the Vdd with 10% decrements at each frequency, and with 10% off to account for worst case operation. For comparison purposes, planar CMOS-based clock trees in 45 nm technology may also be synthesized at 1 GHz and 2 GHz, while scaling down the clock voltage. The normalized power dissipation profiles in these planar CMOS and FinFET clock trees are shown in FIG. 5.

Two key observations may be made from these trends: First, the FinFET-based clock trees can provide significant power savings (up to 55%, as explained in Section 4.2) through voltage scaling and satisfy timing constraints at higher frequencies such as 3 GHz, which is 3× of its planar CMOS counterpart that does not scale well beyond 1 GHz (2 GHz planar CMOS has an inferior solution with ~4:5× more power consumption). In terms of power and performance budgeting: 1) A FinFET-based clock tree running at 3 GHz and 72% of the nominal Vdd can provide much higher performance compared to a planar CMOS clock tree running at 1 GHz with better power savings, whereas 2) a FinFET-based clock tree running at 2 GHz and 70% of the nominal Vdd (i.e. $0:63 \times Vdd$ at worst case) show a low power solution for an operating frequency of 2 GHz.

Second, the limiting factor for voltage scaling in FinFET-based trees is different than that in planar CMOS: Planar CMOS trees stop benefiting from voltage scaling before they stop satisfying the timing constraints. For instance, the planar CMOS clock tree at 2 GHz has the lowest power dissipation at full $0.9 \times Vdd$, despite further voltage scaling (to $0:81 \times Vdd$) being possible. The power consumption in planar CMOS-based clock trees increases after a certain voltage level (depending on the frequency target) due to an excessive number of clock buffers necessary to satisfy slew constraint at lower voltage levels. The limiting factor for FinFET, on the other hand, occurs when the clock buffers cannot switch at that voltage-frequency point, i.e. the end points of FinFET curves in FIG. 5. It is concluded that it is a beneficial but not a straight-forward exercise to perform voltage and frequency scaling on FinFET-based clock trees: Instead, it is a paradigm shift that requires a new CTS methodology, i.e. SLECTS.

4.2 FinFET-based CTS with SLECTS

The applicability of SLECTS to FinFET technology node may have application, not limited to but including, in FinFET technology as it is becoming common for sub-22 nm integrated circuits. In order to investigate the performance of SLECTS against the previous skew-driven methodologies, the power and timing measurements of the cases (Case 1 through Case 3) introduced in Section 3 were compared at 20 nm FinFET technology, operating at 2 GHz and 3 GHz. For experimental analysis, the floorplan area and the capacitance values of ISPD'10 benchmarks were scaled by $0:25\_$, considering the technology scaling (45 nm to 20 nm, square of technology scaling_0.25). The skew constraint was set to 50 ps, and the slew constraint is set to 10% of the clock period for each frequency to be consistent with the results in Section 3. Two voltage levels were assumed at each frequency: 1) $0.9 \times Vdd$ of this technology (0.9V in the nominal case), 2) Low Vdd that is achievable by all benchmarks, which is $0.63\_Vdd$ at 2 GHz and $0.72 \times Vdd$ at 3 GHz. As in planar CMOS case, all experiments were performed at the worst case of operation (10% off target Vdd, SS, −40 degrees C.) to identify the lower bounds of improvement of SLECTS. Note that the worst case occurred at the lowest temperature in FinFET technology, unlike planar CMOS that observes worst timing at the highest temperature. The comparative results are shown in Table 5 (FIG. 9) and Table 6 (FIG. 10) at 2 GHz operation for $0.9 \times Vdd$ and $0.63 \times Vdd$, respectively.

The power savings of SLECTS compared to Case 1 are 9% and 10% at $0.9\_Vdd$ and $0.63\_Vdd$, respectively. This slight decrease in power savings (compared to 1 GHz planar CMOS results shown in Table 2 and Table 3) shows that FinFET technology is more suitable (in terms of slew handling) for 2 GHz operation, and the power savings through slew-awareness (of SLECTS) are not as critical (10% compared to 17% of planar CMOS at 1 GHz). However, when the slew constraints are tighter at 3 GHz operation, the power savings of SLECTS are 17% for both $0.9\_Vdd$ and $0.72 \times Vdd$, as shown in Table 7 (FIG. 11) and Table 8 (FIG. 12), respectively. This increase in power savings shows the applicability of SLECTS to future nodes, as interconnect resistance is predicted to be higher, and the supply voltage (Vdd) levels are predicted to be lower, both of which increase the challenge of handling slew. Another observation is that the power savings of SLECTS did not improve more than 1%, when the Vdd is scaled down within the same frequency operation (9% vs. 10% in 2 GHz, 17% vs. 17% in 3 GHz), unlike planar CMOS technology (7% vs. 17% at 1 GHz). This is due to the tolerance of FinFET transistors to voltage scaling, therefore, the challenge of slew handling may not increase critically when voltage is scaled with the same frequency (i.e. slew) target. Thanks to this tolerance to voltage scaling, the power savings of SLECTS [step 1 130 and step 2 140 combined with the power savings through voltage scaling (that is enabled by net splitting of Step 3 150)] may be as significant as 55% and 51% at 2 GHz and 3 GHz operations, respectively, compared to 33% of planar CMOS at 1 GHz. Alternatively, frequency scaling of $1:5\_$ is possible to operate at 3 GHz, with only a 3% increase in power dissipation on the clock tree.

5. Conclusion

In SLECTS, the high interconnect resistance may be managed with a net splitting technique on long wires, and new merging point selection and computation techniques are introduced for power savings. The proposed methodology is shown to be effective for power savings, increasingly at low voltage nodes. Thus, it may be applicable for at least low power designs. Furthermore, the SLECTS methodology has been verified in testing on FinFET-based clock trees to achieve voltage scaling for low power or frequency scaling for performance, while providing additional power savings compared to existing methodologies. SLECTS may be integrated into contemporary academic and industrial CTS tool flows for a slewdriven approach, similar to DME having been popular for the traditional skew-driven CTS approaches.

While the invention has been described with reference to the embodiments above, a person of ordinary skill in the art would understand that various changes or modifications may be made thereto without departing from the scope of the claims.

The invention claimed is:

1. A system for performing slew-driven clock tree synthesis for selecting a merging point location for a set of existing nodes comprising the steps:
   pair selection and cost metric definition considering physical distance between nodes for efficient sink clustering;
   slew and skew-aware merging point computation for routing; and
   slew and insertion slew-aware net splitting;
   wherein pair selection, slew and skew-aware merging point computation, and slew and insertion slew-aware net splitting merge pairs of nodes into a new node and the steps are repeated for pairs from the set of nodes and a set of new nodes until the number of nodes from the set of nodes and new nodes equals one node, wherein the one is the merging point location, wherein the repeating of the steps is an iteration.

2. The system of claim 1, wherein the pair selection comprises distance-based techniques in which minimum distance pairs of nodes are selected for merging together.

3. The system of claim 2, wherein the merging pair selection considers all possible pairings of nodes at each iteration.

4. The system of claim 1, wherein the merging point location is determined to perform routing of a minimum cost pair of nodes.

5. The system of claim 1, wherein the merging point location is determined within a merging region considering a slew constraint in the same phase.

6. The system of claim 5, wherein a zero skew merging point location is selected according to the equation (1):

$$L_i = \frac{0.5 C_{unit} L(i,j)^2 + L(i,j) C_j}{C_i + C_j + L(i,j) C_{unit}} + \frac{t_j - t_i}{R_{unit}(C_i + C_j + L(i,j) C_{unit})}, \quad (1)$$

where Li is the merging point location, L(i; j) is the distance between two nodes), Runit and Cunit are a per unit resistance ($\Omega$=μm) and capacitance (fF/μm) of an interconnect between the two nodes, ti and tj are an insertion delay from i and j to their sinks, respectively, and Ci and Cj are the capacitance at the two nodes, respectively.

7. The system of claim 6, wherein merging point computation comprises a Logic Flow comprising the following:
   1: Maxi=max[Dins(i)]
   2: Maxj=max[Dins(j)]
   3: Mini=min[Dins(i)]+skewconst
   4: Min j=min[Dins(i)]+skewconst
   5: Compute CS1 by computing LCS1 with equation (1) for ti=Maxi, tj=Min j
   6: Compute CS2 by computing LCS2 with equation (1) for ti=Mini, tj=Maxj
   7: Compute min slew point m by solving equation (4)

$$S_i^2 - (\ln(9) \times ED(m,i))^2 = S_j^2 - (\ln(9) \times ED(m,j))^2 \quad (4)$$

where Si and Sj are target slew values at the two nodes i and j, ED(m,i) and ED (m,j) is an Elmore delay of m and i and m and j respectively,
   8: if min(CS1;CS2)<m<max(CS1;CS2) then
   9: Merging point k=m
   10: else if min(CS1;CS2)>m then
   11: Merging point k=max(CS1;CS2)
   12: else
   13: Merging point k=min(CS1;CS2)
   14: end if
wherein each end point CS1 and CS2 represents a corner case when a skew within the pair of nodes is equal to a skew constraint skewconst, and any point in a permissible merging window must satisfy this skew, wherein min[Dins(i)], max[Dins(i)], min[Dins(j)] and max[Dins(j)] represent the minimum and maximum insertion delay for nodes i and j.

8. The system of claim 1, wherein at the end points of the nodes, a permissible merging window is created for a location of a new node along an axis of the pair of nodes.

9. The system of claim 8, wherein the permissible merging window is a line of potential merging points on which a skew constraint is satisfied.

10. The system of claim 9, wherein after the permissible merging window is generated, the minimum slew point is computed, wherein the minimum slew point is defined as the point that makes the slew at the pair of nodes equal in order to obtain the minimum slew at both nodes.

11. The system of claim 10, wherein the minimum slew point is set as the merging point when both nodes are located within a possible merging window.

12. The system of claim 10, wherein when the slew point is located outside the possible merging window, the merging point is set as one of a set of corner points to satisfy skew constraints.

13. The system of claim 10, wherein when a permissible merging window does not exist because no possible merging point location satisfies skew constraint, a buffer is inserted between nodes.

14. A method for performing slew-driven clock tree synthesis for selecting merging point location for a set of existing nodes comprising the steps:
   defining pair selection and cost metric considering physical distance between nodes for efficient sink clustering;
   computing a slew and skew-aware merging point for routing; and
   slew and insertion slew-aware net splitting;
   wherein pair selection, slew and skew-aware merging point computation, and slew and insertion slew-aware net splitting merge pairs of nodes into a new node and the steps are repeated for pairs from the set of nodes and a set of new nodes until the number of nodes from the set of nodes and new nodes equals one node, wherein the one is the merging point location, wherein the repeating of the steps is an iteration.

* * * * *